(12) United States Patent
Orava et al.

(10) Patent No.: US 7,391,771 B2
(45) Date of Patent: Jun. 24, 2008

(54) METHOD OF SENDING INFORMATION THROUGH A TREE AND RING TOPOLOGY OF A NETWORK SYSTEM

(75) Inventors: Fredrik Orava, Sigtuna (SE); Lars Ramfelt, Palo Alto, CA (US)

(73) Assignee: Metro Packet Systems Inc., Palo Alto, CA (US)

( * ) Notice: Subject to any disclaimer, the term of this patent is extended or adjusted under 35 U.S.C. 154(b) by 822 days.

(21) Appl. No.: 10/810,934

(22) Filed: Mar. 26, 2004

(65) Prior Publication Data

US 2006/0015643 A1    Jan. 19, 2006

Related U.S. Application Data

(63) Continuation-in-part of application No. 10/707,916, filed on Jan. 23, 2004.

(51) Int. Cl.
  *H04L 12/56* (2006.01)
(52) U.S. Cl. ................... 370/389; 370/392; 370/393
(58) Field of Classification Search .............. None
  See application file for complete search history.

(56) References Cited

U.S. PATENT DOCUMENTS 5,802,052 A * 9/1998 Venkataraman ...... 370/395.72
5,859,959 A * 1/1999 Kimball et al. ............. 714/4
7,149,216 B1 * 12/2006 Cheriton ................. 370/392
2006/0050690 A1 * 3/2006 Epps et al. ................ 370/359

* cited by examiner

Primary Examiner—Wing F. Chan
Assistant Examiner—Anthony Sol
(74) Attorney, Agent, or Firm—Rolf Fasth; Fasth Law Offices

(57) ABSTRACT

The method is for sending information through a topology. A first and second node each having a first node having a first access port, a second access port and a first uplink connected to a first router and a second router, respectively. A third node is provided that has a first access port and a first uplink, the first uplink of the third node being connected to the second access port of the first node. A first packet is sent via the first access port to the second node. The second node adds a first port number to a tag of the first packet and sends the first packet via the first uplink of the second node to the first access port of the first node. The first node receives the first packet via the first access port of the first node. The first node adds the first port number to the tag and adds a first port number of the first access port of the first node to the tag. The first node sends the first packet via the first uplink of the first node to a first router.

13 Claims, 6 Drawing Sheets

FIG. 4
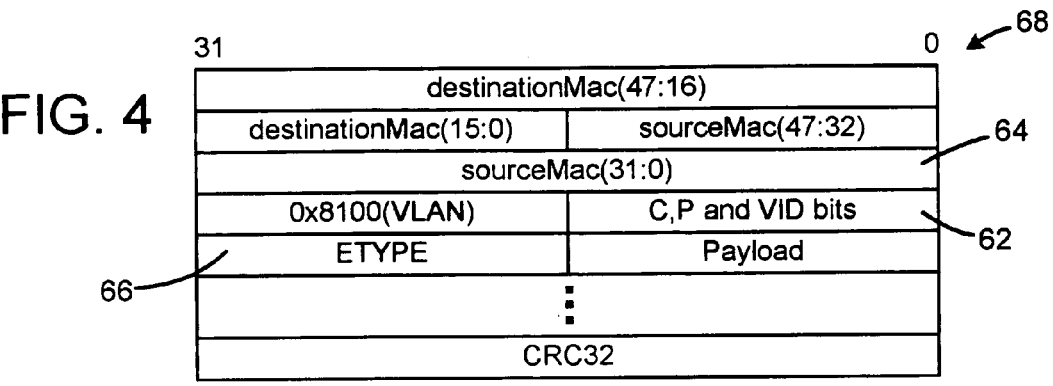
FIG. 5
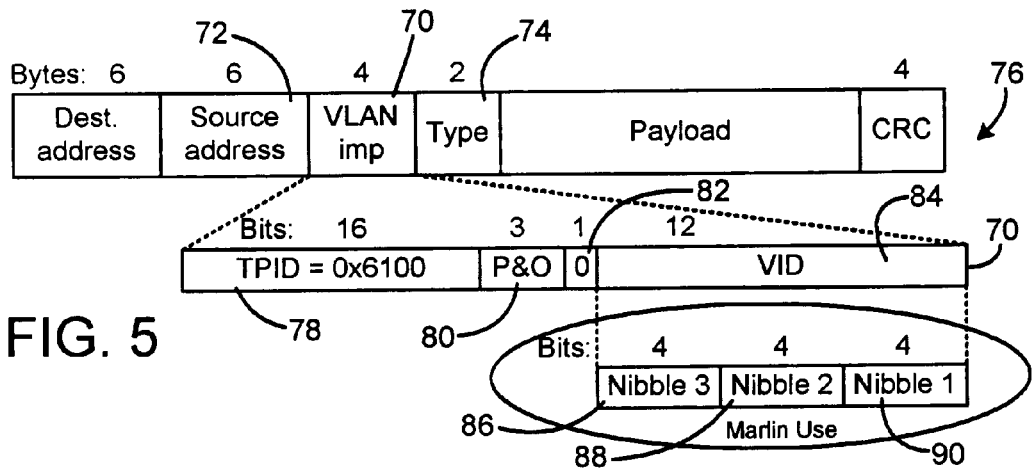
FIG. 6
| Address | Description |
|---|---|
| 0x0 | This level not adressed |
| 0x1 - 0xA | Address for ports 1-10 |
| 0xB - 0xD | Reserved |
| 0xE | Address for AUX port |
| 0xF | Address for ring topology detection |
| Untagged | Address for OAM in unit |
FIG. 7
| Nibble | Valid values |
|---|---|
| Nibble 3 | 0x0 - 0xA, non zero only if Nibble 2 is non zero |
| Nibble 2 | 0x0 - 0xA |
| Nibble 1 | 0x1 - 0xA, 0xE, 0xF |

| Address | First Nibble | Second Nibble |
|---|---|---|
| 0x0 | This level not adressed | This level not adressed |
| 0x1 - 0xA | Ring node 1-10 | Port 1-10 |
| 0xB - 0xC | Ring node 11-12 | Reserved |
| 0xD | Reserved | Reserved |
| 0xE | Reserved | Address for AUX port |
| 0xF | Reserved | Address for topology detection |
| Untagged | Reserved | Address for OAM in unit |

FIG. 8

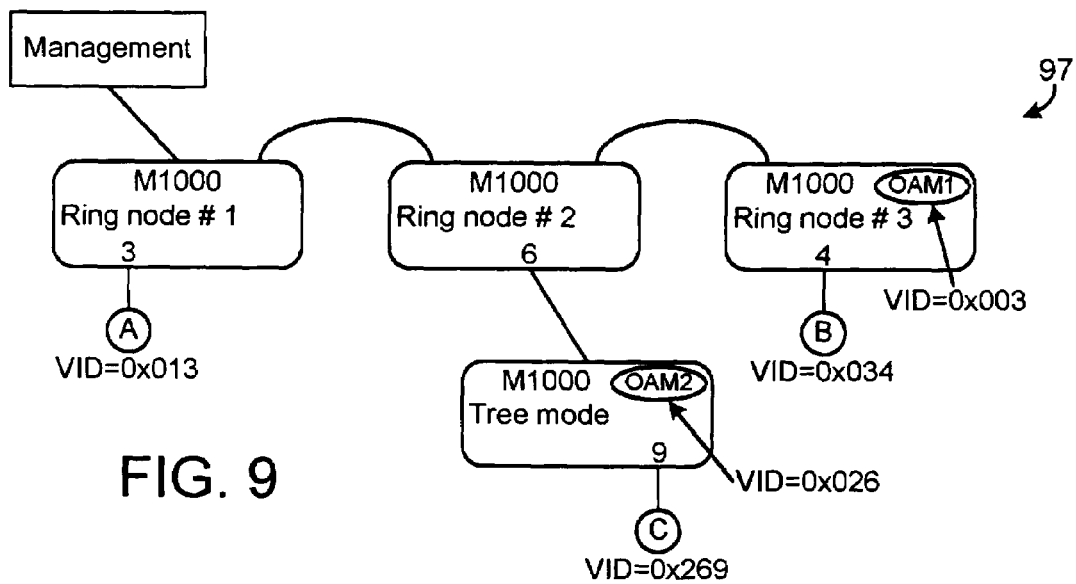

FIG. 9

| Nibble | Valid values |
|---|---|
| Nibble 3 | 0x0 - 0xC, non zero only if Nibble 2 is non zero, 0xB or 0xC only if this field is ring node number |
| Nibble 2 | 0x0 - 0xC, 0xB or 0xc only if this field is ring node number |
| Nibble 1 | 0x1 - 0xA, 0xE, 0xF |

FIG. 10

METHOD OF SENDING INFORMATION THROUGH A TREE AND RING TOPOLOGY OF A NETWORK SYSTEM

PRIOR APPLICATION

This is a continuation-in-part patent application of U.S. patent application Ser. No. 10/707,916, filed 23 Jan. 2004.

TECHNICAL FIELD

The method of the present invention relates to sending information through a tree topology or a ring topology of a network system.

BACKGROUND AND SUMMARY OF INVENTION

Metro networks are often organized in two levels including metro access and metro core systems. Metro access networks are deployed near the end customer while metro core networks aggregate several access networks deployed in different parts of the metro area. The metro core systems also host the gateway(s) to the wide area backbone network. Currently the dominating technology to connect individual customers and businesses to the Internet is a leased 1.5 or 2.0 Mbps TDM circuits from the customer premises to the provider edge node, that is, router or a switch located in the point-of-presence (POP). The edge equipment is populated with channelized TDM interface cards. This TDM circuit, with limited and relatively expensive capacity, is a bottleneck. The access circuit is provisioned separately from the provisioning of the network service, such as an IP service, leading to high operational overhead. When several circuits are aggregated in the TDM access network, statistical sharing of capacity is not possible due to the fixed nature of TDM circuits. Statistical multiplexing of the traffic can occur only first after the traffic reaches the router. The channelized TDM interfaces include complex hardware that monitors each circuit individually but makes line cards expensive.

The capacity bottleneck of the TDM system may be avoided by migrating to a high-capacity packet-based access infrastructure, such as Ethernet. Ethernet equipment is low cost, high capacity, and widely deployed in the industry. Ethernet switches forwards packets based on the destination address. Ethernet switches are intended for friendly enterprise environments and include a number of automatic features in order to ease the installation and operation of the network. However, these automatic features become problematic in large scale operator environments. The automatic features do not scale to large infrastructures and needs sometimes to be disengaged to increase security. This requires manual configuration of possibly a large number of individual units. One specific example of an automatic feature of Ethernet switches is that they dynamically learn each unique source address of the packets received in order to optimize the forwarding of traffic. It is sometimes necessary to disengage this learning process to prevent customers from being able to communicate directly with each other without going through a service provider. In summary, problems with basic Ethernet switches include: no support for customer separation; low degree of security due to the fact that cross traffic directly between end-customers is allowed; dynamic address learning may open up for DoS attacks; and requires distributed element management and service creation due to the fact that a potential large set of distributed units needs to be configured and managed; and the standard based Spanning Tree Protocol (STP) based restoration is slow.

The method of the present invention provides a solution to the above-outlined problems. More particularly, the method is for sending information through a topology. A first and second node each having a first access port, a second access port and a first uplink connected to a first router and a second router, respectively. A third node is provided that has a first access port and a first uplink, the first uplink of the third node being connected to the second access port of the first node. A first packet is sent via the first access port to the third node. The third node adds a first port number to a first section of a tag of the first packet and sends the first packet via the first uplink of the third node to the first access port of the first node. The first node receives the first packet via the first access port of the first node. The first node shifting the first port number to a second section of the tag and adds a first port number of the first access port of the first node to the first section of the tag. The first node sends the first packet via the first uplink of the first node to a first router.

BRIEF DESCRIPTIONS OF THE DRAWINGS

FIG. 4 is a schematic illustration of a frame with a shim header;

FIG. 5 is a schematic illustration of VLAN packet with nibbles;

FIG. 6 is a schematic illustration of tree mode addressing;

FIG. 7 is a schematic illustration of rules of tree mode addressing;

FIG. 8 is a schematic illustration of ring mode addressing;

FIG. 9 is a schematic illustration of ring mode addressing;

FIG. 10 is a schematic illustration of rule of ring mode addressing;

DETAILED DESCRIPTION

In general, the method of the present invention includes steps for sending information up and down a tree topology of nodes in a network. The method also covers the steps of sending information in a ring topology of nodes. The method includes steps of adding a tag and port numbers when the packet moves upwardly in a tree topology towards edge equipment such as a router or a switch, i.e. in an ingress direction, so that each node shifts previous port numbers and adds a port number before forwarding the packet. When the packet moves from a router or switch downwardly in the tree topology, i.e. in an egress direction, each node removes a port number, such as the port number of the departure port, from the tag and shifts the subsequent port numbers within the tag. The invention is not limited to shifting the port numbers between nibbles. It is also possible to merely add and remove port numbers and other identification information from the nibbles without shifting such information.

Figure 1:
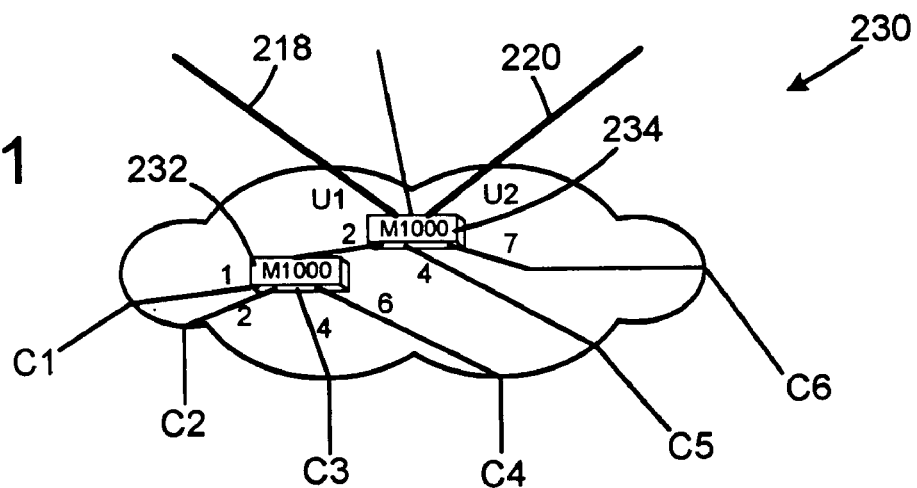
FIG. 1 is a schematic illustration of node units in an access network.

With reference to FIG. 1, the physical topology 230 may include Marvin node units 232, 234. A tree structure may be used to aggregate the customer traffic in several steps towards a hub node. A daisy-chain of Marvin multiplex units 232, 234 can be used to simplify the build out when a tree is unsuitable or to reduce the amount of fiber or copper links as well as the number of router or switch interfaces. The units 232, 234 can be used to connect and merge a plurality of customer lines while keeping each customer's traffic separate with tags so the traffic streams are not mixed up. For example, each unit may have ten customer ports and two uplinks. The units 232, 234 may have the characteristics of receiving and sending Ethernet frames and the units only switch information between the access ports and the network ports and vice versa but not between different access ports. The tags may be used to distinguish the traffic from and to the customers so that a virtual interface in the provider edge equipment may be set up for each customer. Preferably, the tags are of a type that is currently used by many provider edge equipments to make the implementation easy. As explained in detail below, when untagged traffic is coming from a customer the Marvin node units add the tags before the traffic is sent to other nodes or to the router. Similarly, when traffic going from the provider edge equipment to the customer, tag segments are removed and shifted as the packet moves towards the customer. The provider edge equipment may in turn be connected to an IP network or any other suitable network.

Many different access network service architectures may be used. The architectures may be based of the number of redundant connections to the metro core network and to the customer site. Single and dual connections provide four possible combinations including a single network that has a single customer connected thereto. In a single-network-single-customer architecture, the access network is attached to the metro core via one connection and the customer is connected to the access subsystem via one connection. All traffic transmitted from the network core via the access system is delivered without duplication to the customer and vice versa. All redundancy and restoration mechanisms are hidden within the access subsystem. It is impossible in this architecture to protect the attachment links or attachment nodes.

Another situation is a dual network with a single customer attached thereto. The access network is attached to the metro core via two independent connections and the customer is connected to the access subsystem via one connection. In this way, two provider edge nodes may be connected to the access network so that one provider edge node may be the back-up for the other in case the first one malfunctions. All traffic transmitted from the network core via any of the two metro core attachment links are forwarded to the customer. Traffic from the customer is forwarded to both of the two metro core access links if the provider edge equipment is capable of filtering the information in order to avoid duplication (i.e. IP routers). In other environments, such as switched Ethernet, ingress traffic is only sent via one of the two metro core access links. This additional filtering is provided by the Marlin node attaching to the metro core. It is possible in this architecture to protect the attachment links or attachment nodes, but it requires additional functionality in the metro core system or in the customer system. The requirements may be fulfilled by specific redundancy mechanisms such as VRRP, HSRP or generic dynamic routing protocols such as OSPF. VRRP and HSRP only effects the metro core system, OSPF requires also the customer to participate in the protection procedure.

Another classification is a single-network with a dual-customer attached thereto. The access network is attached to the metro core via one connection and the customer is connected to the access subsystem via dual connections. All traffic transmitted from the network core via the access system is delivered without duplication to either of the customer connections. Two modes of this system are possible. Either the customer delivers one copy of each frame to both of the attachment connection or the customer delivers a single copy to one of the attachment connections. In both cases the access network guarantees to deliver the traffic without duplication. If the customer choose to send traffic to only one of the access links it requires the customer to interact either with the access system itself or the metro core system to accomplish restoration in case of failures.

The last classification includes a dual-network with a dual-customer attached thereto. The access network is attached to the metro core via dual connections and the customer is also connected to the access subsystem via dual connections.

A basic requirement for all types of restoration mechanisms is the presence of redundant resources. One common model is to use one specific resource as primary and protect it by a back-up or stand-by resource of the same type. One resource can be the back-up for a number of primary resources. The types of resources that can be duplicated in access systems built with Marlin units are communication links and Marlin nodes. The communication link includes optical as well as electrical ones. To provide a high degree of redundancy, the duplicated links should be located in different cables in order to achieve physically different communication paths. Nodes, such as Marlin units, can be duplicated in order to protect against nodes failures and to provide a mechanism to perform up-grades and maintenance on these without disturbing the service delivery.

The node unit of the present invention implements a multiplexing stage to be used in access networks connecting to routers and switches. The small size and low per port and per unit cost allows the unit to be located very close to customers or inside the customer premises.

All multiplexing, de-multiplexing in the system of the present invention may be based on standard 802.1q tagged Ethernet frames. Future products may utilize other schemes such as MPLS or IP tunneling. The general mechanisms are however the same allowing different implementation options when needed. With three levels, or less, of multiplexing a single VLAN tag may contain the full path information such as source route information, only placing a requirement of being able to handle a single tag on the router or switch. The logical topology of the access system is preferably hub-and-spoke, but the physical topologies can be daisy-chains, rings and trees possibly with multiple redundant nodes distributed in the physical topology.

Preferably, the supported link mode is full duplex only for TX links since FX links are always full duplex. This allows for simpler management of the access network independent of link types. The usage of full duplex links can also helps maintaining QoS and simplifies configuration and error localization in Marlin node networks.

Each node unit may have ten access ports so that each access port may be used to connect a customer or another Marlin node unit. Of course, the node units may have more or fewer access ports. All ingress data arriving on the access port are tagged with the corresponding port number and then forwarded to the network port(s). Access ports are isolated from each other and direct communication, without passing the root node, between two access ports is not possible. This increases security and prevents unwanted cross-traffic.

Preferably, there are two uplink network ports in each node unit. The network ports are used to connect to a switch, router or another Marlin unit. Packets arriving on the network port are assumed to be tagged with the outgoing access port number that the packet is destined for. As outlined in detail below, the frames are sent out on the access port and the port routing information in the tag is removed. If the remaining tag is 0, indicating that the last hop in Marlin network has been reached, the complete tag is removed, as explained in detail below.

The node unit may be managed via any of the network ports or a dedicated management port such as the AUX port. One purpose of the AUX port is to allow a management station to be attached to the Marlin node unit when both of the network ports are used as uplinks. The AUX port is a 10/100 Ethernet port only used to connect an external computer running a Marlin software with a remote CLI process or other management software, to the unit for local debugging in the field or to directly connect a Marlin unit controller (MUC).

The Marlin node units, such as the M1000 products, may use optical fiber interfaces for some of the ports. SFP cages are used and may be populated with SFP modules with different ranges and modes. The network ports are made of copper and fiber, one RJ45 copper connector and one SFP fiber module per port. Preferably, only one of them is active at a time. The access ports are copper for M1000T and fiber for M1000F.

Preferably, the M1000F has ten 100 Mbps fiber optical access interface ports, two dual network ports and one AUX port. Each access port is a small form factor with a pluggable optical transceiver (SFP) socket that accepts modules. Each of the two network ports of the M1000F is both copper 10/100/1000 Mbps and fiber 100/1000 Mbps Ethernet ports. The network SFP cages can be populated with 100 Mbps or 1000 Mbps SFP modules. When both fiber and copper interfaces are connected the selected default interface is active while the other interface is disabled.

Two redundant fans are located on the right side of the unit. Each of the fans provides enough airflow for cooling. The fans are not accessible from the outside of the unit. The fan status can be monitored by the management system and if a fan fails an event notification message may be generated.

The Optional Management Card (OMC) is an internal CPU card that provides additional services to the base M1000 system. The OMC card runs a custom network operation system with SNMP agent(s), a command line interface (CLI) and other management processes.

To simplify management of a Marlin system, and minimize the possibility of configuration errors, automatic topology detection and configuration is available. One purpose of the automatic topology detection is to allow an operator or a management station to execute an automatic topology detection protocol and gather the complete physical topology map without prior configured knowledge about the topology.

The basic mechanism used to collect information about node status and topology is the soon to be standard EFM OAM Information PDUs such as IEEE802.3ah-Ethernet in the first mile (EFM). Preferably, a Marlin unit will always terminate untagged OAM Information PDUs received via the network ports and reply with a vendor specific extended EFM OAM Information PDU. With this mechanism the node closest to the management station can be probed and configured. With the closest unit configured and configured to a known state it is possible to probe further in the network topology.

Probing down a tree topology may be done top-down. When the first unit is probed and configured the units connected to the access ports can be probed and then configured. For example, probing of the unit connected to port 3 of the top unit is done with Ethernet frames containing a tag with value 0x003. The first unit removes the tag before sending the probe to port 3 untagged. By probing all access ports with active links in the tree hierarchy all units can be detected and configured.

Probing for ring topologies may mean that probe messages are sent out on network ports (U1 or U2) to investigate if the network port of another Marlin is connected. To generate an untagged probe to be sent out on a network port of a specific node located somewhere in the infrastructure, the probe is tagged in such a way that it arrives to the node with a tag 0x00E. If the probe tagged with 0x00E arrives on U1, the untagged probe is forwarded on U2. When the untagged probe response later arrives from U2 it is tagged with 0x000E and forwarded via U1. Tree probing requires two mechanisms to be present in a node. Firstly, probe messages tagged with 0x00E and arriving via one network port are transmitted untagged via the other network port. Secondly, untagged probe reply messages arriving via one network port are tagged with 0x00E and transmitted via the other network port. Probe messages are implemented as standard EFM OAM Information PDUs. Probe reply messages are implemented as vendor specific extended EFM OAM Information PDUs. In the case a Marlin unit controller is present at the AUX port or an OMC port it will be responsible for all probing and the messages will always pass through the unit controller. There are two cases how ring probing is done depending on the mode the known unit is configured to. Firstly, if a Marlin unit is in tree mode and it receives an OAM packet addressed to 0x00E from a network port, it will remove the tag and send it out on the other network port for probing. If another unit is daisy chain connected to this port it will process the probe and reply back untagged. The first unit recognizes that it is a probe reply and tag the frame with port-id 0x00E and the forward it the other network port. Secondly, if a node is in ring mode and it receives a packet addressed 0x0rE, wherein r=ring node number for the unit, from a network port, it will remove the tag and send it out on the opposite network port. If another unit is daisy chain connected to this port it will process the probe and reply with an untagged. The first unit recognizes that it is an OAM probe reply and tags the frame with port-id 0x0rE and forwards it to the other network port. In this way, it is possible to probe and configure the units that are connected in daisy chain in the same way as for tree topologies.

Figure 2:
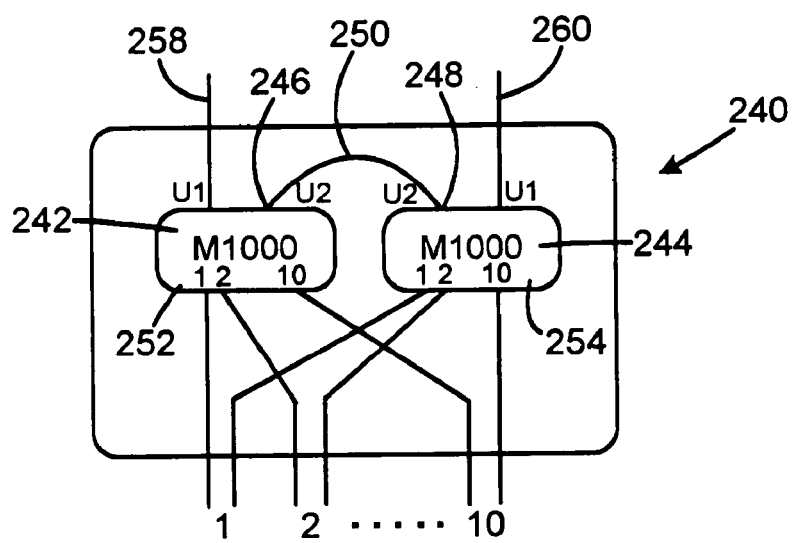
FIG. 2 is a schematic illustration of two node units connected in a tandem mode.

FIG. 2 shows two Marlin units 242, 244 of a system 240 that may be connected in tandem to provide redundancy. Of course, the Marlin units 242, 244 do not have to be connected in tandem. When connected in tandem the U2 network ports 246, 248 of the two Marlin units or nodes 242, 244 are connected together via a U2 link 250 and the access ports 252, 254 are grouped in pairs such that access ports (i), wherein (i)=252/254(1); 252/254(2) : : : ; 252/254(10)), of the two units 242, 244 belong to the same group. The Marlin unit 242 may have a U1 link 258 and the Marlin unit 244 may have a U1 link 260. The index of the port group may be the same as the index of the ports. The behavior of the tandem nodes 242, 244 on a per port basis is described below. Ingress traffic from a customer C is forwarded to both the U1 and U2 links to provide redundancy. If the tandem node is connected to an IP network via one or several IP routers, the routers ensures that the same message is not sent twice to the IP network. If the tandem node is connected to a switched Ethernet via one or several Ethernet switches, it is the responsibility of the tandem node to assure that no duplicated messages are sent into the attachment switches.

The egress traffic of the tandem node 242 may, for example, be received via the network port links U1 of the tandem node 242, i.e. the U1 network ports of one of the constituent Marlin nodes, and is forwarded to one of the access ports of a port group determined by the tag of the received traffic. If traffic is simultaneously received via the other network port of the tandem node, that is, the port U1 of the other constituent Marlin node and is tagged with the same value, that traffic is forwarded to one of the access ports in the same port group, so it does not matter if the tagged traffic comes via one or the other network ports of the tandem node. The routing of traffic within the tandem nodes 242, 244 depends on the tag in same manner as in an individual Marlin node so that frames tagged with 0xXX3 is forwarded to one of the ports in port group 3.

The ingress traffic received via one of the access ports 252, 254 in a port group is forwarded to both of the network ports U1 of the tandem nodes 242, 244. The ingress traffic received via the other port in the group is preferably dropped.

Thus, the behavior of a tandem mode may be the same as the behavior of a normal Marlin node if the port groups are considered as abstract ports so that the identity of the individual ports within a port group is disregarded.

Figure 3:
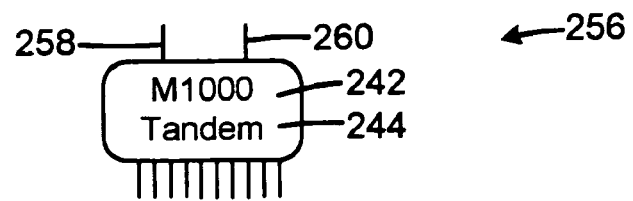
FIG. 3 is a schematic illustration of a tandem node abstraction.

As best shown in FIG. 3, internally the tandem node 256 may consist of two Marlin units 242, 244 with connected U2 ports and two U1 ports 258, 260. Port group (i) of the tandem node 256 may consist of access port (i) of the two constituent units 242, 244. Each of the two Marlin units 242, 244 operates in a tandem mode. When in the tandem mode, a Marlin unit can be in one of two tandem states on a per access port basis, including active and stand-by states. The state of the Marlin unit relative to a first access port may be active while the Marlin unit may be in a stand-by state relative to a second access port. In other words, the state of the Marlin units is in relation to the access ports. When the Marlin unit is in the active state, relative to the access port (p), the Marlin unit operates exactly in the same manner as an ordinary Marlin unit i.e. it forwards data tagged with 0xp received from any of its network ports to port (p) and forwards all ingress traffic received via access port (p) to both of its network ports 258, 260. When in the stand-by state, relative to the access port (p), the Marlin unit by-passes all traffic tagged with 0xXXp received via U1 ports 258 or 260 unmodified to U2 for egress traffic and vice versa for ingress traffic. Furthermore, ingress traffic received via access port (p) is dropped.

A Marlin unit operating in tandem mode may also operate on a per access port and tag basis. In this case, the state relative a first access port and a first tag (p,t) may be active while the state of the Marlin unit may be stand-by relative a second access port and a second tag (p',t') where either p=p' or t=t' may hold. When the Marlin unit is in the active state, relative to the access port (p) and the tag (t), the Marlin unit operates exactly in the same manner as an ordinary Marlin unit i.e. it forwards data tagged with 0xpt, received from any of its network ports to port p and modifies the tag to read 0xt, and forwards all ingress traffic received via access port p tagged with 0xt to both of its network ports 258, 260 and modifies the tag to read 0xpt. When in the stand-by state, relative to the access port (p) and tag (t), the Marlin unit by-passes all traffic tagged with 0xpt received via U1 ports 258 or 260 unmodified to U2 for egress traffic and vice versa for ingress traffic. Furthermore, ingress traffic received via access port (p) tagged with 0xt is dropped.

In this way, the tandem node provides a high degree of redundancy because the network ports are duplicated, as is the case in any Marlin unit, the node itself is duplicated, and the access ports are duplicated. A protected access network may constructed by connecting units (U) with dual network ports to the tandem nodes such that both network ports of the unit (U) are connected to the two ports of the same port group of the tandem node. Any system can be connected to the access side of a tandem node and be protected as long as it accepts data from both network ports and transmits all data received from the access ports to both network ports. Two systems that may support the concept without modification are the Marlin units themselves and the ADVA units such as FSP150CP units. It should be noted that a complete sub-tree built from Marlin or tandem units can be connected to a port group. It should also be noted that an unprotected chain built from Marlin units fulfills the above requirements and can thus be connected to a port group.

With reference to FIG. 4, it is possible to insert a header 62, such as a shim header, between a source address 64 and an Ethernet type ETYPE 66 of a typical 802.1q frame format 68 such as IEEE 802.3.

As shown in FIG. 5, the Marlin unit of the present system may use a 32 bit shim header or tag 70 based on the IEEE 802.1q format that is positioned immediately after a source address 72 of an IEEE 802.3 Ethernet packet 76.

The tag 70 may include a TPID field 78, priority field 80, CFI field 82 and a VID field 84. The 12 bit VLAN ID field (VID) 84 may be divided into three independent 4-bit fields such as a nibble 86, nibble 88 and nibble 90 used for storing the source routing information. This results in up to three multiplexor levels per 802.1q header. More levels may be used but requires the router to process multiple 802.1q headers to map a customer port to a virtual interface that is QinQ. The Marlin unit uses the VID (VLAN Id) field 84 of the tag for addressing and forwarding of packets through the unit. Preferably, the TPID section 78 is always set to 0x8100. The priority field 80 may be used for prioritization of packets. The CFI field 82 is usually not used by the Marlin unit and is preferably always set to zero.

As indicated above, the 12-bit VID field 84 may divided into the nibbles 86, 88, and 90 where each nibble is used for addressing in one level in a Marlin tree topology. When addressing in a tree topology, the first non-zero nibble (starting with nibble 86) indicates the address for the first unit the packet arrives to. The next nibble, such as nibbles 88, 90 if any, indicates the address for the next unit down or up in the tree hierarchy of nodes.

FIG. 6 shows an example 92 of how the tag addressing may be done in a tree topology. FIG. 7 defines rules 93 for valid addressing when the unit is in the tree mode or point-to-point mode.

As shown in FIG. 8, ring/daisy-chain addressing 95 has two nibbles of the VLAN tag that are used for one level of the ring. The first nibble is used for ring-node number addressing. The second nibble is used for address port in the ring-node. This leaves one nibble that can be used for addressing in one additional tree level. When addressing in a ring the first non-zero nibble, starting with nibble 90, indicates ring-node number and the following nibble indicates the port address.

FIG. 9 shows how addressing in a ring topology 97 may be done and FIG. 10 defines rules 99 for valid addressing when the unit is in ring-mode. Port 0xE is used for ring topology detection and is described in the topology detection paragraph.

Each access port, such as ports 58, 60, may be in branch or leaf mode to indicate if the port is connected to another marlin node unit or to a customer. When the node is in the branch mode and a tag is present the tag is modified with the arriving port number. When the node is in the branch mode and no tag is present, a new tag is added in the same manner as if the node where in leaf mode as described below. When the node is in the leaf mode, which may be the default mode, a new tag is always added to the arriving frames. A new 802.1q shim header is added to packets that arrive on the port independently of the packet content. The 12-bit tag is set to the branch mode hex (00X) where (X) corresponds to the port number 1..A. When the node is in the branch mode, the uplink of another marlin unit is attached to this port. Arriving ingress packets that already contain a marlin specific 802.1q shim header are modified to include both the port information from the previous unit(s) and the port info from this unit. The 12-bit tag is therefore set to hex (0YZ) where (Y) corresponds to added port number.

Figure 11:
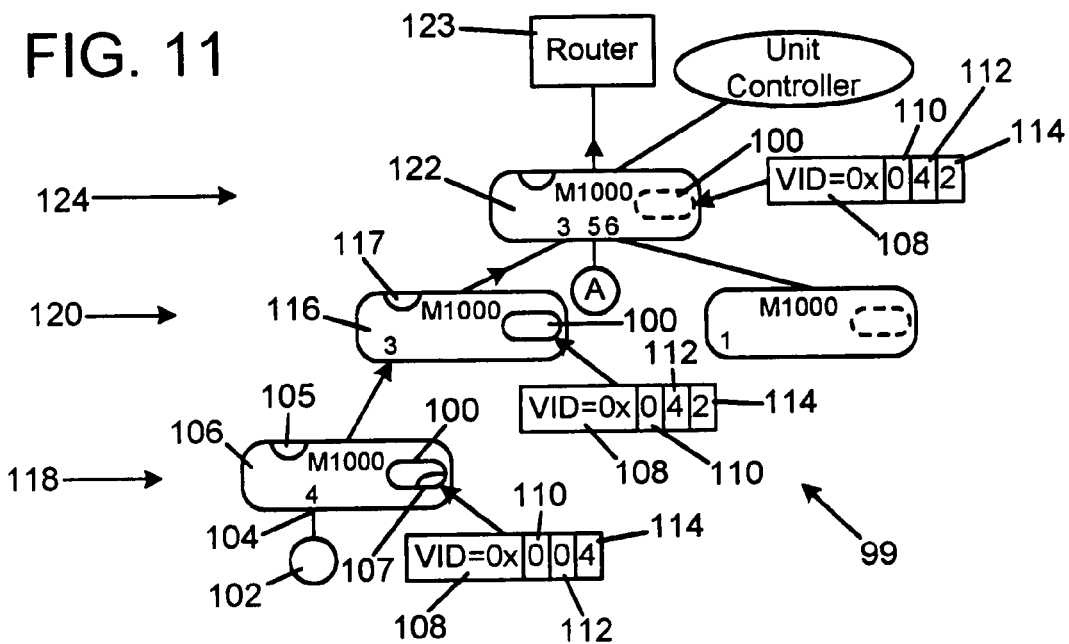
FIG. 11 is a schematic illustration of port number shifting in ingress traffic.

With reference to FIG. 11, when a packet arrives on an access port that is set in the leaf mode a VLAN tag 108 is added to the packet. The node adds the port number to the VID field 108 of the tag so that a packet arriving to port 4 will have the VID field set to 0x004. Packets containing VLAN tags and arriving to access ports when the node is in the branch mode will have their tag modified. The port number at which the packet arrives on is added to the tag on the first empty or zero nibble in the tag, starting with, for example, the rightmost nibble. In this way, an ingress packet with tag VID 0x004 arriving on port 2 will be forwarded to the network port with tag VID 0x042. Packets without VLAN tags arriving to access ports when the node is in the branch mode are treated in the same way as packets arriving to access ports when the node in the leaf mode. Access ports can be set to U1/U2/both mode. If an access port is set to U1, packets from this port will only be forwarded to network uplink ports U1. If an access port is set to U2, packets from this port will only be forwarded to network uplink ports U2. If an access port is set to both, packets from this port will be forwarded to both network ports U1 and U2. Preferably, OAM replies are always sent back via the same port as the request arrived via, regardless of the U1/U2/both setting.

For example, a packet 100 may arrive from a customer 102 to an access port 104 of a node 106 that is in a leaf mode 105 which means the node is located at the lowest level of a node tree 99. If the node 106 is in the branch mode, it is presumed that the packet already has a tag and that a previous node in the leaf mode lower down in the tree has already added the tag with the VID field. Since the node 106 is in the leaf mode, the node 106 adds an empty tag 107 to the packet 100 with the VID field 108 and the nibble furthest to the right is filled in with the port number at which the packet 100 arrived. For example, the VID field 108 of the packet 100 may have nibbles 110, 112, 114. If the packet 100 arrives on port 4, the nibble 114 will be set to 4 so that the VID field 108 may read 0x004 before it is sent further up in the node tree 99. When the node 106 forwards the packet to a node 116 that is in a branch mode 117, the information in the VID field 108 is shifted one step to the left. If the packet 100 arrives on network port 2 of the node 116, the nibble 112 is modified to include the number 4, to illustrate the port number on a first node level 118 and the nibble 114 will modified to include the number 2 to illustrate the port number on a second node level 120 so that the VID field 108 reads 0x042. In this way, the port number of the nibble 114 is shifted to the nibble 112 while the nibble 114 receives the new port number of the node at the higher level of the tree topology 99.

When the node 116 forwards the packet to a node 122, the information in the VID field 018 is again shifted one step to the left. If the packet 100 arrives on access port 3 of the node 122, the nibble 110 will be modified to include the number 4, the nibble 112 will be modified to include the number 2 and the nibble 114 will be modified to include the number 3 to illustrate the port number on a third node level 124 so that the VID field 108 reads 0x423. The node 122 then sends the packet 100 to a router or a switch 123 that may send the information to the desired address of a network core system. If the router or switch 123 notices that the VID field 108 is not configured correctly, the router or switch 123 may be set to drop the packet.

Figure 12:
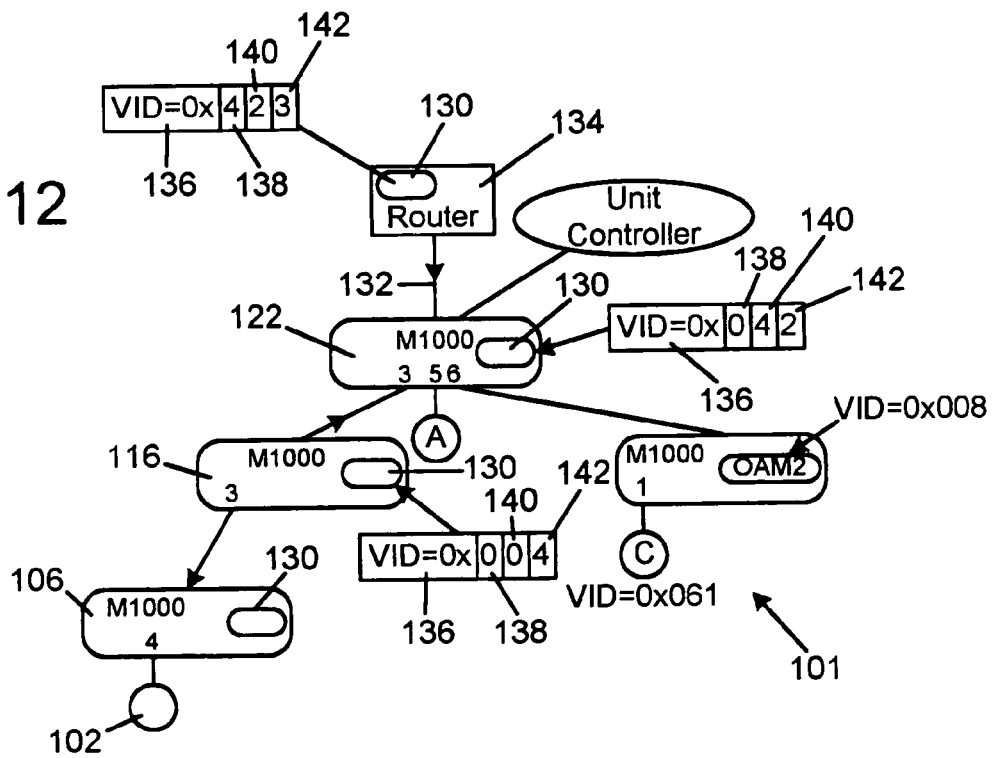
FIG. 12 is a schematic illustration of port number removal in egress traffic.

With reference to FIG. 12, when a tagged packet arrives on a network port, i.e. an egress arrival, its destination is defined by the first non-zero nibble in the VID field of the VLAN tag. It should be noted that the VID field does not include an address of the final customer, only the port number of the leaf node to which the customer is connected. If the first non-zero nibble is 0x1-0xA, the packet is forwarded to the queue for the corresponding port. The tag is also modified so that the first non-zero nibble is set to 0. If only the last nibble is non-zero the VLAN tag is removed since the packet has reached its final destination through the tree topology. Untagged EFM OAM frames may be forwarded to the OAM function of the unit.

For example, a packet 130 may arrive on a link 132 to the node 122 from a router 134. Before sending the packet into the node tree 101, the router 134 adds the tag and the correct VID field information, according to a router table, and the path through the node tree 101. Either the router and/or the node may verify that the added tag is configured correctly. If the tag is not configured correctly, the packet may be dropped. The packet may receive a VID field 136 that reads 0x423. The node 122 first reads the number in the nibble 142. Before sending the packet 130 via port number 3, the port number is then removed and the VID information is shifted one step to the right so that the VID field 136 reads 0x042. The node 116 that is linked to port 3 of the node 122 receives the packet 130. The node 116 first reads the number in the nibble 142. Before sending the packet 130 via port number 2, the port number in the nibble 142 is removed and the VID information is again shifted one step to the right so that the VID field 136 now reads 0x004. The node 106 that is linked to port 2 of the node 116 receives the packet 130. The node 106 first reads the number in the nibble 142. Before sending the packet 130 via port number 4 to the customer 102, the entire tag including VID field is removed, since only the last nibble is non-zero.

Figure 13:
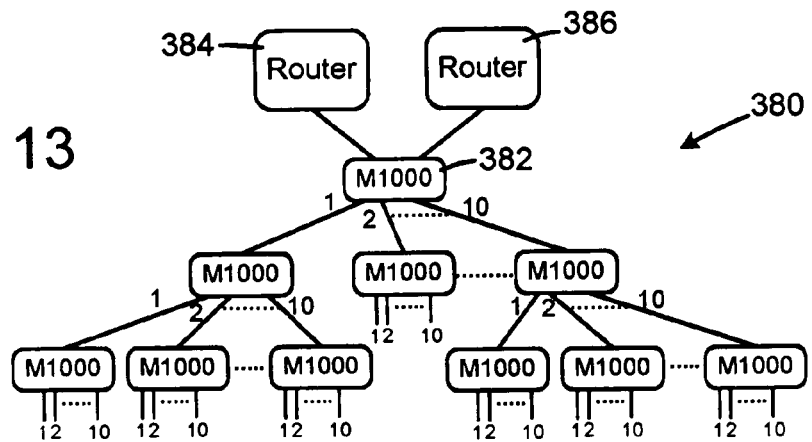
FIG. 13 is a schematic illustration of an unprotected tree topology of the present invention.

As best shown in FIG. 13, it is possible to construct trees with up to three levels so that an unprotected tree topology 380 may be constructed. The top Marlin unit 382 is connected to the routers 384, 386. In this way, the number of customers that can be connected increases substantially.

Figure 14:
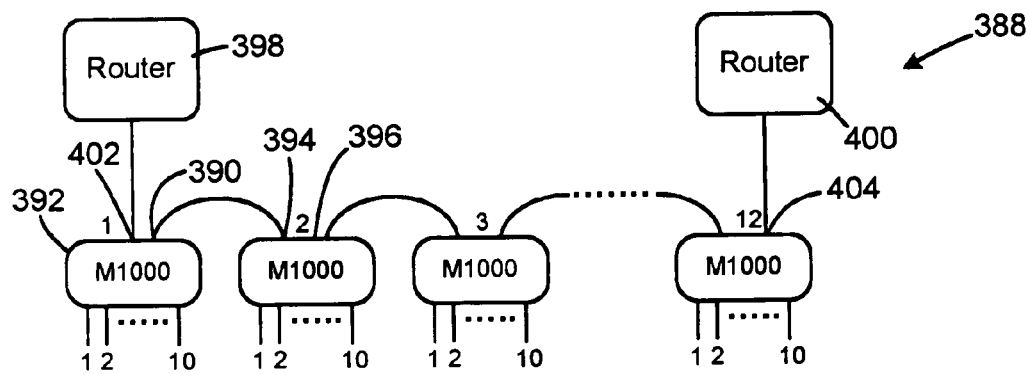
FIG. 14 is a schematic illustration of a redundant daisy-chain topology of the present invention.

As best shown in FIG. 14, the Marlin units can be deployed in a daisy chain topology 388 where one network port 390 of a first Marlin unit 392 is connected to a network port 394 on another Marlin unit 396 and so on. A first portion of the tag may address the Marlin unit on the chain while a second portion of the tag may address the port on the Marlin unit. In this way, a Marlin unit will forward the information between the network ports as long as it is not the Marlin unit referred to in the first portion of the tag. When a Marlin unit receives information into one of the access ports, the Marlin unit may add the first portion of the tag the number of the Marlin unit on the chain and a second portion of the tag the number of the port number from which the information was received. The Marlin unit will then forward the information in both uplinks, as described above. Up to 12 units can be connected in a single chain. Of course, more or fewer units may be used as required. It is also possible to support router redundancy in a chain by connecting the same or two independent routers 398, 400 to the two end-points 402, 404 of the chain. If the chain breaks egress traffic to a chain node arriving to the router on the other wrong side of the break may be lost and the system may never recover. Some customers may still have service in this scenario.

This is a problem related to VRRP/HSRP and is in principle identical to the problem discussed above in relation to the tandem node. Other mechanisms, such as OSPF, may recover completely even after the chain breaks. VRRP/HSRP provides router redundancy and provides protection of the link connected directly to the router port but may not reliably recover from other failures.

Figure 15:
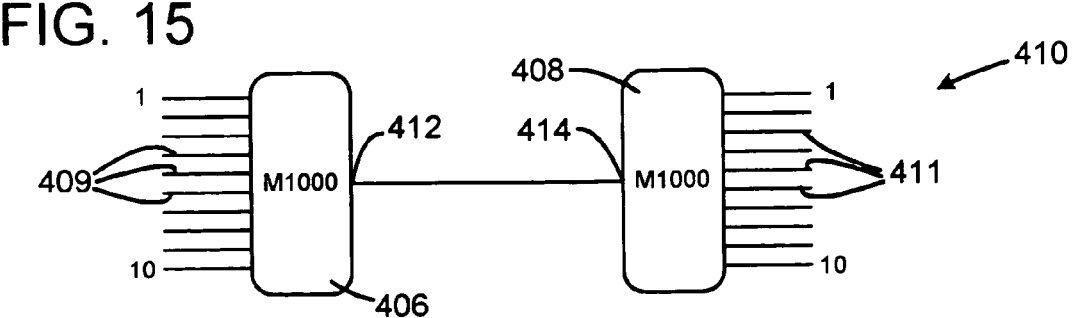
FIG. 15 is a schematic illustration of an unprotected point-to-point topology of the present invention.

As best shown in FIG. 15, the Marlin units 406, 408 can be connected in a point-to-point topology 410 by connecting the network port 412 of the unit 406 to the network port 414 of the other unit 408. The customers 409 are connected to the unit 406 and the customers 411 are connected to the unit 408.

A protected tree topology may be constructed by using tandem nodes in the same manner as unprotected trees are constructed from the Marlin units. A tandem node is a protected tree. A multi-level protected tree may be constructed by connecting both the network ports of a Marlin unit, or a tandem node, to the two ports of a port group of a tandem node.

The following requirement may be placed on protected trees. A tree is protected at level (i) only if it is also protected at level (i−1). This requirement implies that protected trees are built top-down starting from the root. For example, if the second level is constructed using Tandem nodes, then so is the first level. Examples of redundant tree topologies are given in the figures below.

Figure 16:
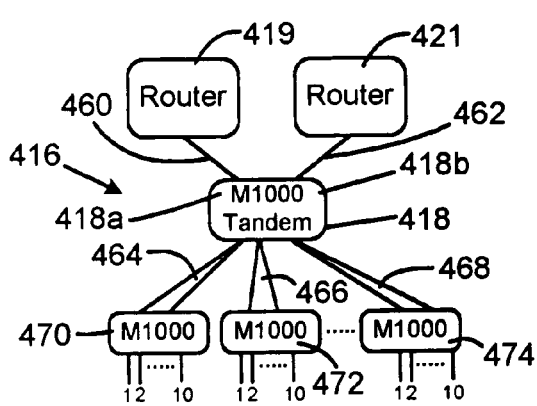
FIG. 16 is a schematic illustration of a redundant tree topology having a tandem node of the present invention.

FIG. 16 shows a redundant tree topology 416 where the top level is constructed using a tandem node 418 that includes the single nodes 418a and 418b. Preferably, each tree topology has only one top node that is directly connected to the routers 419, 421. In this way, the tandem node 418 may have an network link 460 connected to the router 419 while another network link 462 is connected to the router 421. The tandem node 418 has also pairs of access links 464, 466, 468, one from each node 418a and 418b, connected to the nodes 470, 472, 474, respectively.

Figure 17:
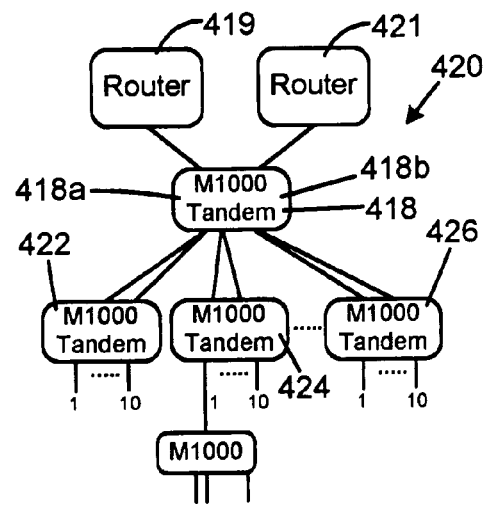
FIG. 17 is a schematic illustration of a redundant tree topology having a plurality of tandem nodes of the present invention.

In FIG. 17 a tree topology 420 is shown wherein also the second level is built using redundant tandem nodes 422, 424, 426. Router redundancy may be supported in protected trees in exactly the same way as in unprotected trees i.e. by connecting dual redundant routers to the dual uplinks of the protected tree.

Figure 18:
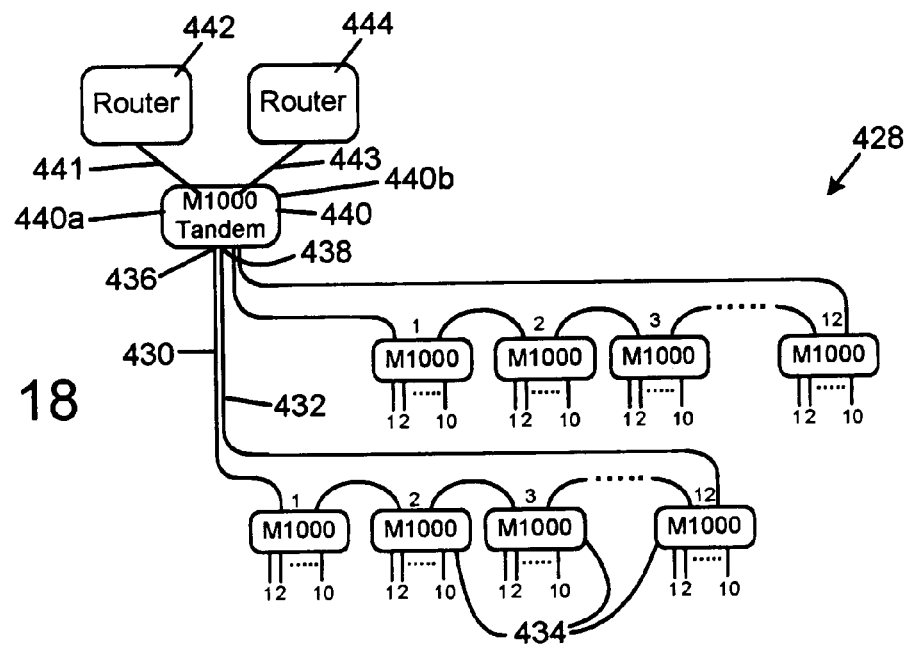
FIG. 18 is a schematic illustration of a redundant ring topology having a tandem node of the present invention.

As best shown in FIG. 18, a protected chain topology 428 is constructed by connecting to the uplinks 430, 432 of an unprotected chain 434 to the two ports 436, 438, respectively, of a port group of a tandem node 440 that includes the single nodes 440a, 440b. The port 436 may be associated with the node 440a while the port 438 may be associated with the node 440b. Router redundancy may be provided by connecting two dual redundant routers 442, 444 to the two network ports of the tandem node 440. Traffic that is received by the tandem node 440 will drop the information in one of the links 430, 432, depending upon which node is active or in the stand-by mode, and the tandem node 418 sends the information in both up-links 441, 443. For example, when the node 440a is in the active state and the node 440b is in the stand-by state, the node 440b will drop traffic received in the port 438 connect to the access link 432. The active node 440a will send the information received from the link 430 via the uplink 441 to the router 442 and via a second uplink connected to the stand-by node 440b that forwards the information via the uplink link 443 to the router 444. Traffic that is received by the tandem node 440 will be sent in either link 430 or link 432 to the chain 434, as explained above.

Figure 19:
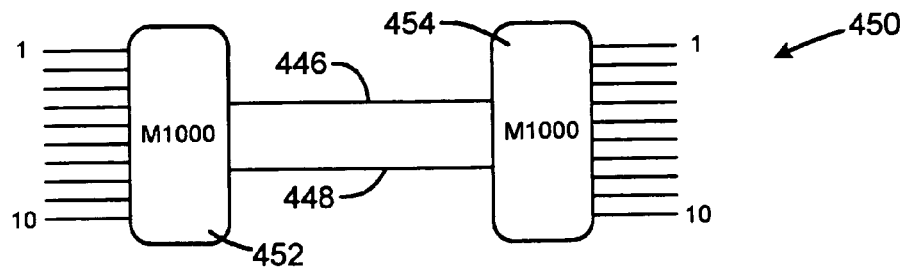
FIG. 19 is a schematic illustration of a redundant point-to-point topology of the present invention.

As shown in FIG. 19, when two uplinks 446, 448 are used in point-to-point configuration 450 data is always sent on both links. It should be noted that the configuration 450 has no routers. For example, the unit 452 may send on both links 446, 448. On the receiver side, such as the unit 454, data is accepted from one of the links 446, 448. The units may automatically select one of the uplink ports from which to receive data. The units may automatically switch over to the other link on the receive side in case of failure on the active link.

While the present invention has been described in accordance with preferred compositions and embodiments, it is to be understood that certain substitutions and alterations may be made thereto without departing from the spirit and scope of the following claims.

We claim:

1. A method of sending information through a physical topology, comprising:

providing the physical topology with a first node and a second node, the first node having a first access port, a second access port and a first uplink connected to a router, the first access port having a first port number and the second access port having a second port number;

the second node having a first access port and a first uplink, the first uplink of the second node being connected to the first access port of the first node, the first access port of the second node having a third port number;

providing a third node having a first access port and a first uplink, the first uplink of the third node being connected to the second access port of the first node;

sending a first packet via the first access port to the second node, the first packet having a tag having a first nibble field and a second nibble field;

the second node adding the third a port number of the first access port of the second node to the first nibble field of the first packet;

the second node sending the first packet via the first uplink of the second node to the first access port of the first node;

the first node receiving the first packet via the first access port of the first node;

the first node adding the first port number of the first access port of the first node to the first or second nibble field of the tag adjacent to the third port number; and the first node sending the first packet via the first uplink of the first node to a first router.

2. The method according to claim 1 wherein the method further comprises providing the first node with a second uplink connected to a first sister node, the first sister node being identical to the first node.

3. The method according to claim 2 wherein the method further comprises, the first node sending the first packet via the second uplink to the first sister node.

4. The method according to claim 3 wherein the method further comprises the first sister node sending the first packet via a first uplink of the first sister node to a second router.

5. The method according to claim 1 wherein the method further comprises determining whether the first nibble field is a first non-empty nibble.

6. The method according to claim 5 wherein the method further comprises determining whether the first node is in a leaf mode or in a branch mode.

7. The method according to claim 6 wherein the method further comprises always adding a new tag when the first node is in the leaf mode.

8. The method according to claim 1 wherein the method further comprises the second node removing a port number stored in a first nibble field of a second packet.

9. The method according to claim 8 wherein the method further comprises the second node removing the port number from the first nibble field when the first nibble field is non-empty.

10. The method according to claim 1 wherein the method further comprises forming a tree topology of nodes connected to one another.

11. The method according to claim 1 wherein the method further comprises forming a ring topology of nodes connected to one another.

12. A method of sending information through a physical topology, comprising:
providing the physical topology with a first node and a second node, the first node having a first access port, a second access port and a first uplink connected to a router, the second node having a first access port and a first uplink, the first uplink of the second node being connected to the first access port of the first node;
sending a first packet in an egress direction from the router via the first uplink to the first node, the first packet having a tag having a first nibble field and a second nibble field;
the first node reading a port number in the first nibble field;
the first node removing the port number in the first nibble field of the first packet;
the first node sending the first packet to the second node;
the second node reading the port number in the second nibble;
the second node removing the port number in the second nibble;
the second node sending the first packet, via the port number read in the second nibble, to a destination device.

13. The method according to claim 12 wherein the method further comprises the first node sending the first packet, via the port number read in the first nibble, to the second node.

* * * * *